United States Patent [19]

Bauer et al.

[11] Patent Number: 4,527,925
[45] Date of Patent: Jul. 9, 1985

[54] ANGLE JOINT

[75] Inventors: Fritz Bauer; Hans-Peter Bauer; Hans J. Bauer, all of Altdorf, Fed. Rep. of Germany

[73] Assignee: Fritz Bauer + Sohne oHG, Altdorf b. Nuremberg, Fed. Rep. of Germany

[21] Appl. No.: 281,564

[22] Filed: Jul. 8, 1981

[30] Foreign Application Priority Data

Aug. 12, 1980 [DE] Fed. Rep. of Germany ....... 3030433

[51] Int. Cl.³ .............................................. F16C 11/06
[52] U.S. Cl. ................................... 403/143; 403/144; 403/319; 403/328; 280/513
[58] Field of Search ............... 403/122, 143, 144, 315, 403/316, 319, 327, 328; 280/513, 512, 511; 285/13

[56] References Cited

U.S. PATENT DOCUMENTS 1,079,531 11/1913 Zähringer ............................. 403/144
2,219,955 10/1940 Gilmore ................................ 280/511
4,225,261 9/1980 Marx .................................... 403/122

FOREIGN PATENT DOCUMENTS 22452 12/1968 Australia .............................. 403/143
2512253 2/1975 Fed. Rep. of Germany .
323976 1/1930 United Kingdom ................. 403/143
994180 6/1961 United Kingdom ................. 280/511

Primary Examiner—Richard J. Scanlan, Jr.
Attorney, Agent, or Firm—Browdy and Neimark

[57] ABSTRACT

An angle joint, consisting of a ball socket and a ball pivot, is pivotally mounted, by means of the ball, in a ball socket recess which is shaped like a spherical cap and acts as a ball seat. On one side of the ball socket is a rigid locating or contact shoulder, which is integral with the ball socket and partially grips the rear of the ball when the ball has been inserted into the recess.

A locking element, which is situated opposite the locating shoulder, also partially grips the rear of the ball when the ball is inserted into the recess. The locking element is slidably located in a guide recess in the ball socket at an acute angle, between 15° to 30°, to the direction of insertion. A locking spring presses the locking element in a direction opposite to the direction of insertion. The locking element is loaded by a pretensioned helical spring, acting as a locking spring, which bears both against the locking element and a section in contact with the ball socket. The locking spring may either bear against a locating collar formed out of the ball socket or against a cap which seals the guide recess. A handle or knob, projecting out of the guide recess may be mounted on the locking element. The locking spring may be bow-shaped and attached to the ball socket at a distance spaced from the locking element. The locking element is preferably made of a strong metallic material and may be constructed integrally with the locking spring, which may be constructed in the form of a leaf spring.

16 Claims, 9 Drawing Figures

ANGLE JOINT

The invention relates to a pivotally mounted angle joint consisting of a ball socket and a ball pivot.

BACKGROUND OF THE INVENTION

In a pivotally mounted angle joint, which is known from German Auslegeshrift (Published Patent Application) No. 25 12 253, the locking element is in the form of a flexible web integral with the ball socket which is made of thermoplastic material. When the ball of the ball pivot is pushed into the socket recess, the said web is deflected perpendicularly to the direction of insertion of the ball and is moved flexibly behind the recess after the ball is pushed fully into the said recess. During movement to remove the ball in the opposite direction to the directon of insertion, the said web would be flexibly deflected in the same manner. In order to prevent this, a filling piece is driven into a recess formed on the turned away side of the web after the ball snap-engages flexibly in the recess, the said flexible web being fixed, in its locking position, by means of the filling piece. The principal disadvantages of this form of ball socket is, just as with numerous other ball sockets which must be sealed by a separate part, the work involved in driving in the filling piece and the fact that the filling piece can be lost. During fitting, the fitter may completely forget the driving-in operation, since the filling piece is very small, thereby making it possible for the ball pivot to be detached from the ball socket, which should not occur under any circumstances for reasons of safety. Finally manufacture of this ball socket is not an easy operation since the flexible web, which forms the locking element, must be deformed when the core forming the recess is removed. Finally, it is also very difficult for the ball pivot to be deliberately detached from the ball socket since the filling piece must again be driven out of the ball socket.

It appears conceivable to reduce the fitting problems, described above, by providing the ball socket with a semispherical recess having an adjacent cylindrical face leading to the opening. Furthermore, a leaf spring should be provided on the outer face of the ball socket, which encompasses the ball socket and which, with ends bent obliquely inwards, engages in the recess by means of corresponding skewed slots or channels. When the ball of the ball pivot is pushed into this recess, the ends of the leaf spring, while being braced, would be pushed out through the slots and, while partially gripping the rear of the ball, would cause the latter to spring back into the recess after the said ball is fully pushed into the recess. Such an embodiment would be extremely disadvantageous since leaf springs cannnot be produced with such precision that a firm and therefore rattle-free fit of the ball in the ball socket would be ensured. Moreover, flaws in the temper of the leaf spring could very easily lead to their breakage. Finally, the free ends of the leaf springs, while being pushed out through the oblique slots or channels, could become wedged therein, which would jeopardize at least the operation of re-engagement.

OBJECTS AND SUMMARY OF THE INVENTION

An object underlying the invention is therefore to design an angle joint, of the generic type discussed above, in such a way that the ball of the ball pivot is locked automatically in the recess of the ball socket but, at the same time, deliberate detachment of the locking means is easily possible.

This object is achieved in accordance with the invention, in the manner more particularly described below. The device, according to the invention makes it possible to achieve absolutely rigid and secure locking of the ball of the ball pivot in the recess of the ball socket due to the fact that the ball is pushed through the opening of the recess in the direction of insertion into the said recess while the locking element is pushed out of the path of insertion in opposition to the force of the locking spring. After the ball has been fully guided into the recess, the locking element is pushed by the force of the locking spring back into its starting position, which corresponds to the locking position in which it extends partially under the ball. When the ball of the ball pivot is loaded in the opposite direction to the direction of insertion, this makes the locking means increasingly firmer since the locking means tightens automatically in like manner. Deliberate detachment of the ball pivot can be effected in the simplest manner by bringing the locking element into its unlocked position in opposition to the force of the spring by means of a pointed object, which is introduced into the recess.

An angle of 15° to 30° indicates an angle range for the acute angle between the direction of insertion and direction of movement of the locking element, within which there is an adequate component of lateral movment of the locking element perpendicular to the direction of insertion, but within which, on the other hand, the ball still moves the locking element upon insertion. The optimum angle range obtained by tests is approximately 20°.

A precisely defined position of the locking element in the locking position is achieved when the locking element bears against a stop shoulder in the guide recess. It is possible for the ball in the locking position to have at least a line contact with the locking element.

In the manufacture of the angle joint of this invention, an advantage in production engineering arises since the core in the injection moulding die for manufacturing the ball socket cannot be removed in the opposite direction to the direction of insertion, but at an acute angle thereto. Thus, the stop shoulder, which is of generic form and lies opposite the locking element, can be formed in the solid material of the ball socket without there being any danger of it being damaged during removal from the die. On the other hand, a part funnel-shaped surface for introducing the ball is created at the same time. An angle of 15° to 25° between the direction of insertion and the lateral face, indicates a particularly favorable angular position for this lateral face.

The locking element is loaded by a pretensioned helical spring acting as a locking spring which bears against the locking element and also against a section in contact with the ball socket. Thus the locking spring may bear against a locating collar formed out out of the ball socket or against a cap, which seals the guide recess. The use of a handle or knob projecting out the guide recess indicates a particularly simple way of removing, i.e. detaching the locking element. Another embodiment may be bow-shaped and attached to the ball socket of the locking spring at some distance from the locking element. This embodiment has the advantage of simple fitting, which is effected particularly by practicing the measures more fully described below. The locking element may advantageously be made of a strong metallic material. The locking spring may be designed to possess a leaf spring construction. This locking spring design, which is generally referred to as bow-shaped, enables manufacture and fitting to be further simplified by making the locking element and locking spring of an integral construction.

BRIEF DESCRIPTION OF THE DRAWINGS

Further advantages and features of the invention emerge from the description of exemplary embodiments of the invention with the aid of the drawing, In the drawing.

DETAILED DESCRIPTION OF THE PREFERRED EMBODIMENTS

Figure 1:
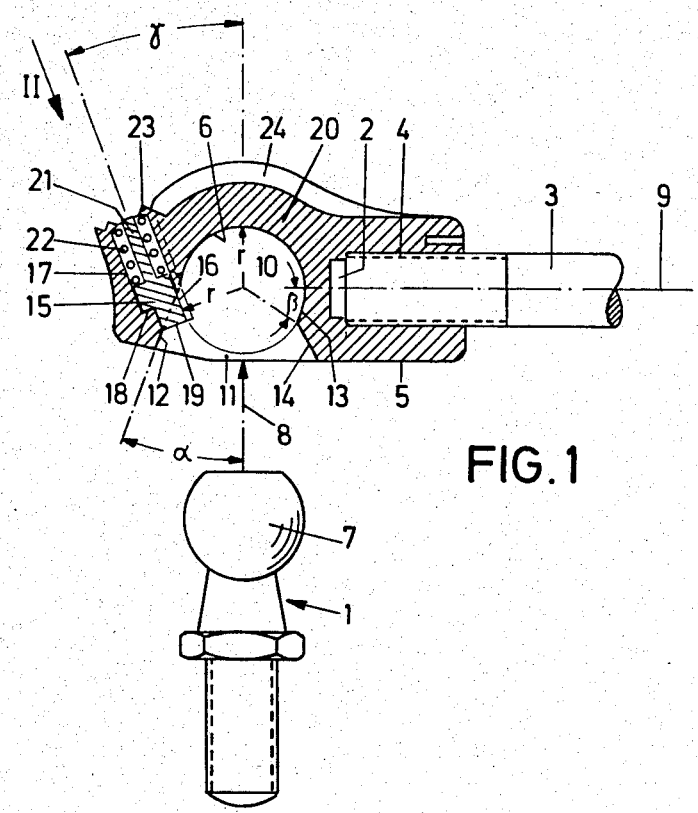
FIG. 1 shows an angle joint according to the invention, consisting of a ball socket, shown in vertical longitudinal section, and a ball pivot prior to its fitting in the ball socket.

The drawing shows a plurality of ball sockets of angle joints, each of which is associated with a ball pivot 1. The ball pivot 1, which is only shown in FIG. 1, is designed according to DIN 71 803 so that no further explanation is necessary in this connection.

All the ball sockets consist of an extended body which is convexly curved on one side and, in the uncurved section of which, there is formed a cylindrical blind hole 2 into which it is possible to insert a pin 3, a rod or the like, to which the ball socket is to be fastened. The fastening between the pin 3, rod or the like, on the one hand, and the ball socket, on the other hand, is effected by means of a thread 4. In each ball socket there is formed a spherical cap-shaped recess 6, which is open towards the underside 5 and, which serves to receive the ball 7 of the ball pivot 1. As is evident from FIG. 1, the direction of insertion 8 of the ball pivot 1, into the recess 6, is perpendicular to the longitudinal axis 9 of the ball socket, on which the ball center 10 of the recess 6 also lies. The opening 11 of the recess 6 to the underside 5 is designed in the following mannner: On the side directed away from the blind hole 2, a lateral face 12 shaped like a segment of a cylinder, runs tangentially out of the spherical surface of the recess 6 to the opening 11 in the underside 5 of the ball socket, and is inclined at an angle $\alpha$ of approximately 20° relative to the direction of insertion 8. On the oppositely lying side, i.e. adjacent to the bottom of the blind hole 2, the spherical surface of the recess 6 is further developed by an angle $\beta$ relative to the longitudinal axis 9 towards the opening 11 so that a contact or locating shoulder 13 is formed. Between the opening 11 and the said locating shoulder 13, there is formed an entry or guide-in face 14, which is inclined towards the lateral face 12 and which tapers from the opening 11 towards the locating shoulder 13. The angle $\beta$ is equal to or slightly greater than the angle $\alpha$, but is under no circumstances smaller than this angle. This design makes it possible that, during injection moulding of the ball socket from plastics material, the core which is necessary for shaping the recess 6 with the lateral face 12, locating shoulder 13 and entry face 14 is removed from the recess 6 at an angle $\alpha$ so that the locating shoulder 13 can be in the form of a locating or bearing surface for the ball 7 of the ball pivot 1, in the solid material of the ball socket, and cannot be damaged during removal from the mould.

To hold the ball 7 of the ball pivot 1, in the recess 6, in the opposite direction to the direction of insertion 8, there is provided a locking element 15 which, on its side open towards the recess 6, is provided with a bearing surface 16 designed in the form of a segment of a cylinder and having a radius r identical to the radius r of the spherical surface of the recess 6. The said bearing surface 16 is inclined at an angle $\gamma$ relative to the direction of insertion 8 so that the bearing surface 16 and the locating shoulder 13 taper towards one another from the recess 6 to the opening 11 in the underside 5 of the ball socket. When the ball 7 of the ball pivot 1 is situated in the recess 6, it is secured by the locating shoulder 13 and the bearing surface 16 of the locking element to prevent removal in the opposite direction to the direction of insertion 8. The locking element 15 is located in a guide recess 17 in which it bears, when in the locking position shown in the drawing, against a stop shoulder 18 which prevents the locking element 15 from being pushed further into the recess 6 in the direction of its opening 11. The direction of movement of the locking element 15 in the guide recess 17 is parallel to the bearing surface 16, i.e. inclined at an angle $\gamma$ to the direction of insertion 8. On the underside of the locking element 15 there is provided an unlocking face 19 which is directed towards the opening 11 and against which the ball 7 of the ball pivot 1 bears when inserted into the recess 6 in the direction of insertion 8, whereby the locking element 15 is fully pushed into the guide recess 17 so that the ball 7 can pass into the recess 6. The bearing surface 16 disappears completely in the guide recess 17 during this insertion movement. After insertion, the locking element is pushed again in the direction of the opening 11 into the recess 6 in a manner yet to be described, thereby locking the ball 7 in the recess 6. In as much as the ball joint has been described so far, the design is the same for all embodiments; for this reason the same reference numerals are also used in this connection in the drawing for all the embodiments.

Figure 2:
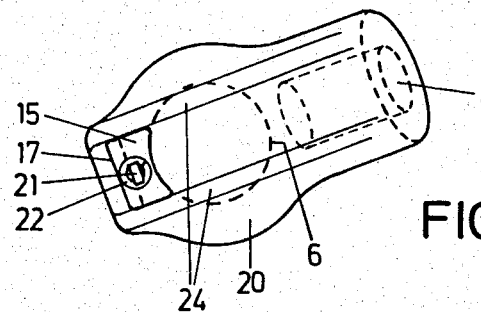
FIG. 2 shows a perspective view of the ball socket in the direction of the indicating arrows II and in FIG. 1.

In the exemplary embodiment according to FIGS. 1 and 2 the guide recess 17 in the ball socket 20 is open in the upward direction. The side of the locking element 15 opposite the unlocking face 19 has a centering pin 21 around which is arranged a locking spring 22 in the form of a pretensioned helical spring. The said locking spring 22 bears, on the one hand, against the locking element 15 and, on the other hand, against a locating collar 23 which partially overlaps the guide recess 17 and which, after the locking element 15 and locking spring 22 are introduced into the guide recess 17, can be produced by thermal deformation of the associated edge area. The ball socket 20 can be provided with stiffening ribs 24 on its rear side which is opposite the opening 11, i.e. the underside 5.

Figure 3:
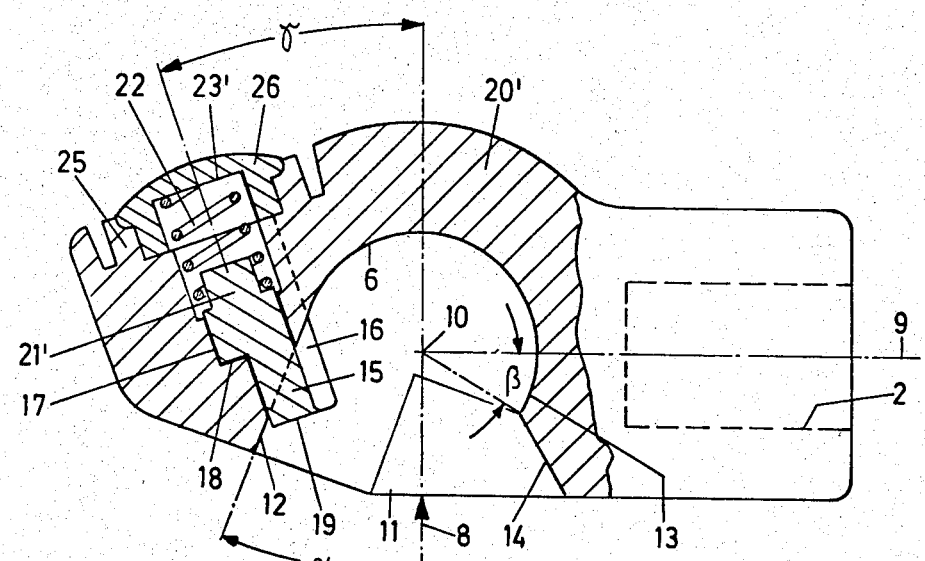
FIG. 3 shows a modified embodiment of a ball socket, greatly enlarged.

The exemplary embodiment according to FIG. 3 differs from that according to FIGS. 1 and 2 only in that the upper side of the guide recess 17 is closed by means of a cap 26 which is flexibly snap-engaged in flexible webs 25 on the ball socket 20' and which at the same time also forms on its inner side the bearing surface 23' for the locking spring 22. In this case the centering pin 21' has a shorter design since it should not strike against the cap 26 even when the locking element 15 is fully inserted into the guide recess 17.

Figure 4:
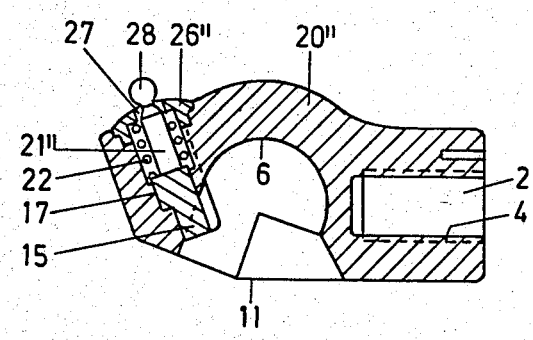
FIG. 4 shows a further modification of the ball socket according to FIGS. 1 to 3.

In the exemplary embodiment according to FIG. 4, the cap 26" is provided with a central opening 27 through which the centering pin 21" protrudes. At its end projecting above the cap 26", the centering pin 21" has a small ball-shaped or similarly shaped handle 28 by means of which the locking element 15 can be drawn into the guide recess 17 in opposition to the slight force of the locking spring 22, whereby the means of locking the ball 7 in the recess 6 and therefore the ball pivot 1 in the ball socket 20" is released or disengaged.

In the exemplary embodiments according to FIGS. 5 to 9 the locking spring is in each case in the form of a bow-shaped spring. As shown particularly in FIGS. 5 and 6, the spring is permanently fixed by means of a barb-shaped retaining element 29 in a retaining recess 30 which is correspondingly designed in cross-section and which is open towards the recess 6. The retaining recess 30 is located parallel to the guide recess 17, i.e. is also arranged at the angle γ to the direction of insertion 8 so that the entire component part, which consists of retaining element 29, bow-shaped spring and locking element 15, can be fitted by means of a rectilinear insertion movement in the direction 31. In the exemplary embodiment according to FIGS. 5 to 7, the blow-shaped locking spring 32 is designed like a leaf spring and, together with the retaining element 29 and a covering part 33 which extends over and some distance from the locking spring 32, is injection-moulded in one piece from a hard elastic thermoplastic material. The locking spring 32 rests on the upper side 34 of the ball socket 35. Pretensioning of the said locking spring can be achieved in that, when in the unfitted state, the spring extends nearer to the retaining element 29. The said locking spring 32 is then pretensioned during fitting, being deflected in the opposite direction to direction 31 by coming into contact with the upper side 34 of the ball socket 35 when the retaining element 29 snap-engages in the retaining recess 30. The locking element 15, in this embodiment, is attached to the locking spring 32 by means of a rivet head 36. The connection can be made by riveting on or, alternatively, by moulding on the locking element 15 and its rivet head 36 during the manufacture of the locking spring 32 with the retaining element 29 and covering part 33. In the ball socket 35 there is formed below the free end of the locking spring 32 a narrow channel 37 in which a small screwdriver or any other sharp or pointed object can be inserted. By this means the locking spring 32 can then be raised and consequently the locking element 15 can be drawn into the guide recess 17 to unlock the ball in the recess 6.

Figure 5:
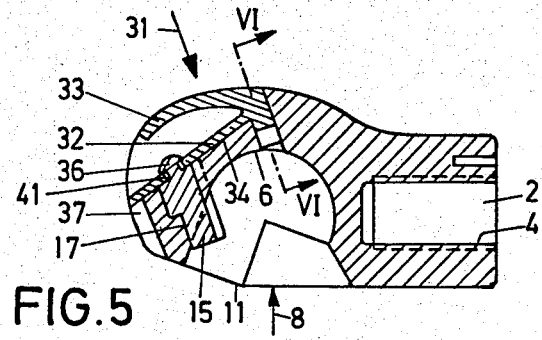
FIG. 5 shows a further exemplary embodiment of a ball socket with differently designed locking spring.
Figure 6:
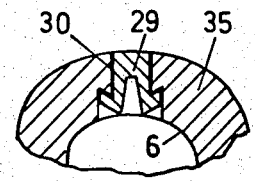
FIG. 6 shows a partial cross-section through FIG. 5 along the line VI—VI in FIG. 5.
Figure 7:
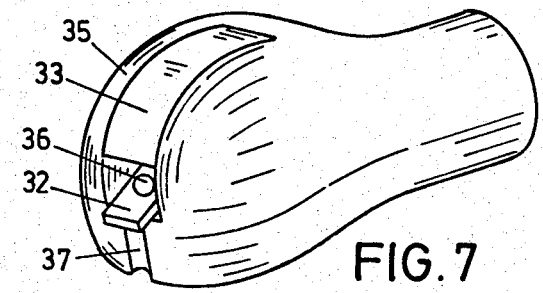
FIG. 7 shows a perspective view of the ball socket according to FIG. 5.
Figure 8:
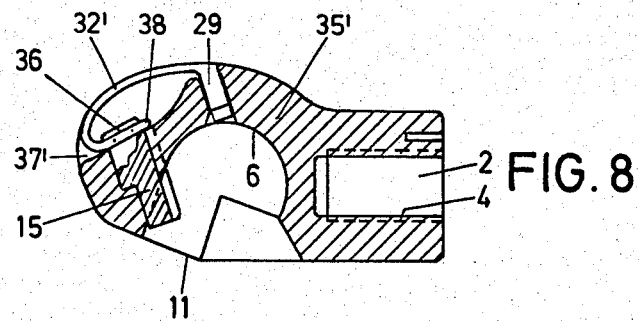
FIG. 8 shows a modified embodiment of the ball socket according to FIGS. 5 to 7.

The exemplary embodiment according to FIG. 8 is very similar to that according to FIGS. 5 to 7. It differs from this embodiment only in that the locking spring 32' does not extend in a straight line from the retaining element 29 to the locking element 15, but, while overlapping the latter, is guided back from the outside in an inward direction approximately along the line of the covering part 33. The guiding element 15 is in turn fastened to this inner free end 38 of the locking spring 32' by a rivet head 36. On the common outer edge of the ball socket 35' and locking spring 32', both parts are rounded off so as to form a channel 37' into which a sharp or pointed object can be inserted to raise the locking spring 32 and consequently also the guiding element 15 in the opposite direction to direction 31.

In all the previously described exemplary embodiments the locking element 15 could be in the form of a component which is in itself independent and made of metal.

Figure 9:
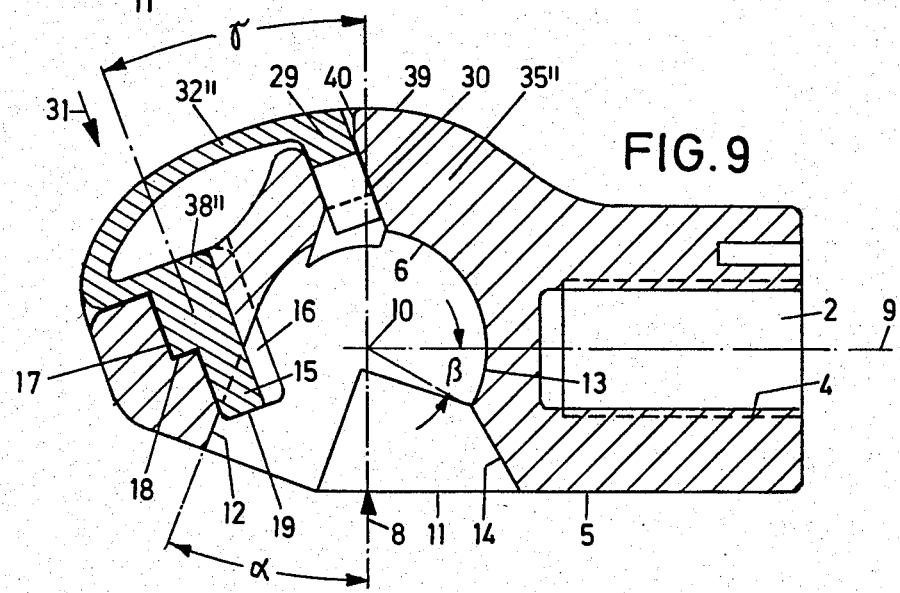
FIG. 9 shows a further modification of the ball socket according to FIGS. 5 to 7.

In the exemplary embodiment according to FIG. 9 the locking spring 32" is designed in the same manner as that in the exemplary embodiment according to FIG. 8. The locking element 15 is also moulded so as to be integral with the inner free end 38" of the spring. As can be seen in this enlarged view, the area between the retaining recess 30 and the rear side 39 of the ball socket 35" can be provided with a rounded edge so that the retaining element 29 can also be deformed to produce elastic restoring or resetting forces.

The locking springs 32 and 32' can obviously also be in the form of leaf springs made of spring steel.

It should be added that the locking elements 15 in the exemplary embodiments according to FIGS. 1 to 4 can be moved in a flawless manner in the guide recess 17 parallel to themselves since the locking springs 22 which are in the form of helical springs are compressed or extended in the direction of movement.

In the exemplary embodiments according to FIGS. 8 and 9, a rectilinear, i.e. a tilt-free, movement of the locking element 15 in the guide recess 17 is ensured by bending the locking springs 32' or 32" back from above over the upper end of the locking element 15 and then in an arc through approximately 180° where it is first connected to the locking element 15 in the area of its inner free end 38 or 38".

In the embodiment according to FIGS. 5 to 7 this problem is solved by providing the leaf-shaped locking spring 32 with an oblong hole 41, extending in the longitudinal direction of the locking spring 32, at a point where the spring is penetrated by the rivet head 36 so that corresponding crosswise movements between the locking element 15 and the locking spring 32 are possible.

We claim:
1. An angle joint consisting of a ball socket and a ball pivot, which is pivotably mounted by means of its ball in the ball socket, the socket having an opening and being shaped like a spherical cap defining a ball seat, the socket including on one side a rigid locating or contacting shoulder which is integral with the ball socket and partially grips the rear of the ball when the latter has been inserted into the socket opening and a locking element, located opposite the locating shoulder, and slidably extending into the socket opening for partially gripping the rear of the ball when the latter is inserted into the socket opening, the locking element being moved out of the socket opening and its locking position when the ball is pushed in the direction of insertion into the socket opening, characterized in that the locking element is slidably located in a guide recess in the ball socket at an acute angle (γ) of 15°–30° to the direction of insertion and is pressed, in the opposite direction to the direction of insertion, into the locking position by means of a locking spring;

said guide recess having a portion extending transversely to the direction of movement of the locking element and forming a stop shoulder, said locking element being so formed as to have a bearing surface, said locking element bearing surface abutting against said stop shoulder in said guide recess when in said locking position and being free to move against said locking spring when in said locking position;

said locking element including a contact surface which partially grips the rear of said ball, said locking element contact surface comprising a segment of a cylinder having a radius identical to the radius of said socket opening said locking element further having an underside including an unlocking face on said underside directed toward the opening of said socket, said unlocking face bearing against the ball when the ball is inserted into the socket opening in the direction of insertion, whereby the locking element is pushed into the guide recess so that the ball can pass thereby into the socket opening.

2. Angle joint according to claim 1, characterized in that the acute angle ($\gamma$) is approximately 20°.

3. Angle joint according to any one of the claims 1 or 2, characterized in that, in the area of the locking element a lateral face in the form of a segment of a cylinder extends tangentially out of the recess in the direction of its opening which broadens towards the opening at an acute angle ($\gamma$) in the opposite direction to the direction of insertion.

4. Angle joint according to claim 3, characterized in that the acute angle ($\alpha$) between the direction of insertion and the lateral face is 15° to 25°.

5. Angle joint according to any one of the claim 1 or 2, characterized in that the locking element is loaded by a pretensioned helical spring acting as a locking spring which on the one hand bears against the locking element and, on the other hand, against a section in contact with the ball socket.

6. Angle joint according to claim 5, characterized in that the locking spring bears against a locating collar which is formed out of the ball socket.

7. Angle joint according to claim 5 characterized in that the locking spring bears against a cap which seals the guide recess.

8. Angle joint according to any one of the claims 1 or 2, characterized in that a handle or knob which projects out of the guide recess is mounted on the locking element.

9. Angle joint according to any one of the claims 1 or 2, characterized in that the locking spring is bow-shaped and is attached to the ball socket at some distance from the locking element.

10. Angle joint according to claim 9, characterized in that the locking spring is permanently fixed in a matched retaining recess of the ball socket by means of a retaining element.

11. Angle joint according to claim 10, characterized in that the retaining relement is barb-shaped.

12. Angle joint according to claim 10, characterized in that the locking spring and the retaining element are designed in one piece.

13. Angle joint according to any of the claims 1 or 2, characterized in that the locking element, which acts as a separate component, is made of metal.

14. Angle joint according to any one of the claims 1 or 2 characterized in that the locking spring is designed like a leaf spring.

15. Angle joint according to any one of the claims 1 or 2, characterized in that the locking element is designed integrally with the locking spring.

16. An angle joint consisting of a ball socket and a ball pivot, pivotably mounted by means of its ball in the ball socket;

said socket having an opening and being shaped like a spherical cap defining a ball seat, the ball socket further comprising on one side a rigid locating or contact shoulder which is integral with the ball socket and partially grips the rear of the ball when the latter has been inserted into the socket opening;

a locking element located opposite the locating shoulder, slidably extending into the socket opening and also partially gripping the rear of the ball when the latter is inserted, the locking element being moved out of the socket opening and its locking position when the ball is pushed in the direction of insertion into the socket opening;

the locking element being located in a guide recess in the ball socket at an acute angle ($\gamma$) of 15°–30° to the direction of insertion;

the locking element being pressed, in the opposite direction to the direction of insertion, into locking position by means of a locking spring;

said guide recess having a portion extending transversely to the direction of movement of the locking element and forming a stop shoulder, said locking element being so formed as to have a bearing surface, said locking element bearing surface abutting against said stop shoulder in said guide recess when in said locking position being free to move against said locking spring when in said locking position, and being maintained in said locking position by the interaction of said locking spring with a surface associated with the ball socket remote from said stop shoulder;

said locking element including a contact surface which partially grips the rear of said ball, said locking element contact surface comprising a segment of a cylinder having a radius identical to the radius of said socket opening; and said locking element further having an underside including an unlocking face on said underside directed toward the opening of said pocket, said unlocking face bearing against the ball when the ball is pushed into the socket opening in the direction of insertion, whereby the locking element is pushed against said locking spring within the guide recess until the ball can clear said unlocking face, whereby the action of the locking spring then automatically moves the locking element into engagement with said locking shoulder.

* * * * *